United States Patent
Namerikawa et al.

(10) Patent No.: US 6,347,555 B1
(45) Date of Patent: Feb. 19, 2002

(54) FORCE SENSOR CIRCUIT

(75) Inventors: Masahiko Namerikawa, Seto; Kazuyoshi Shibata, Mizunami, both of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/536,079

(22) Filed: Mar. 24, 2000

(30) Foreign Application Priority Data

Mar. 26, 1999 (JP) .......................................... 11-084881

(51) Int. Cl.⁷ .............................. G01L 1/04; G01B 5/30
(52) U.S. Cl. .............................. 73/862.637; 73/862.68; 73/760
(58) Field of Search ................... 73/777, 760, 862.041, 73/862.042, 862.043, 862.044, 862.637, 862.68

(56) References Cited

U.S. PATENT DOCUMENTS

| | | | | |
|---|---|---|---|---|
| 3,640,130 A | * | 2/1972 | Spescha et al. | 73/862.043 |
| 5,010,773 A | * | 4/1991 | Lorenz et al. | 73/862.041 |
| 5,365,799 A | | 11/1994 | Okada | |
| 5,398,194 A | * | 3/1995 | Brosh et al. | 702/64 |
| 5,696,322 A | * | 12/1997 | Mori et al. | 73/504.12 |
| 5,859,561 A | * | 1/1999 | Vanoli | 327/516 |

FOREIGN PATENT DOCUMENTS

JP      5-26744      2/1993

* cited by examiner

*Primary Examiner*—Max Noori
(74) *Attorney, Agent, or Firm*—Burr & Brown

(57) ABSTRACT

A force sensor circuit has an operating member, a supporting base arranged in the vicinity of and surrounding the operating member, a flexible plate from which the operating member is suspended into a hollow space of the supporting base, a force sensor element having at least one piezoelectric element, a resistor having a resistance value not smaller than 10 MΩ, and an operation amplifier. This force sensor element can be produced with reduced fluctuation of the frequency characteristics, thus achieving high degree of uniformity of the force sensor circuit products.

10 Claims, 10 Drawing Sheets

Z DIRECTION : AWAY FROM SHEET OF DRAWING

Y DIRECTION : INWARD DEPTHWISE

FIG. 3(a) - Prior Art
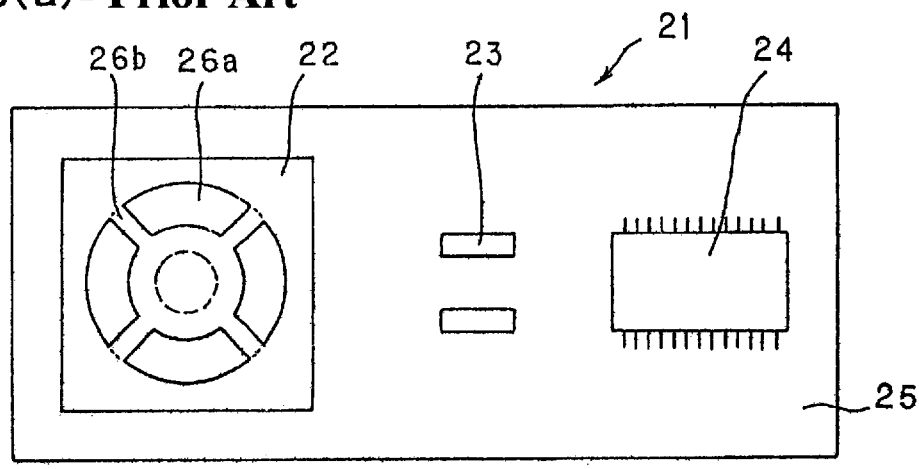
FIG. 3(b) - Prior Art
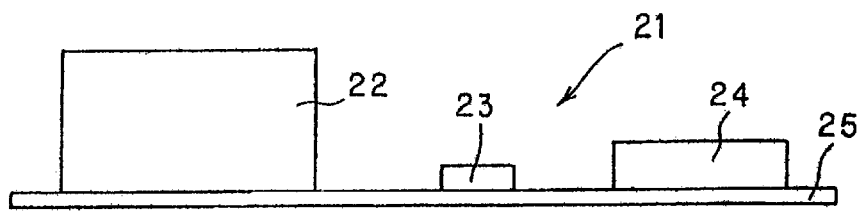
FIG. 3(c) - Prior Art
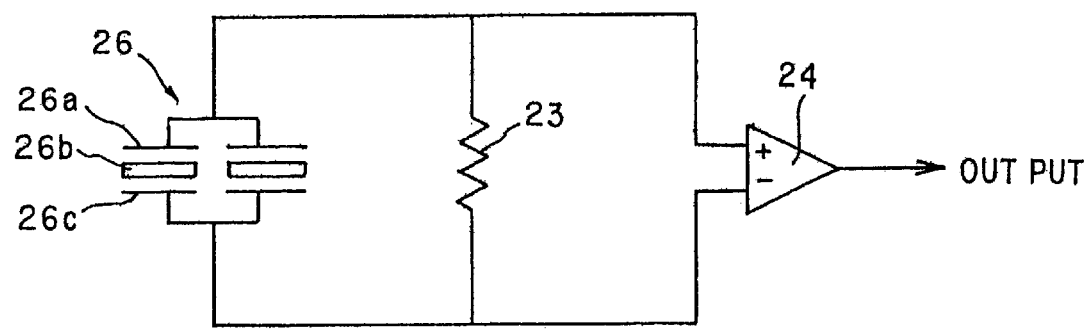

FIG. 5(b)
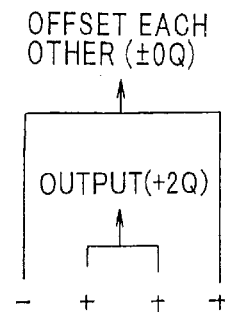
FIG. 5(a)
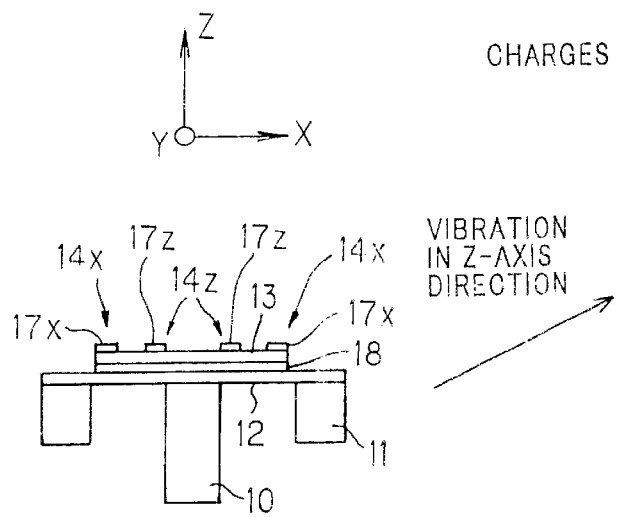
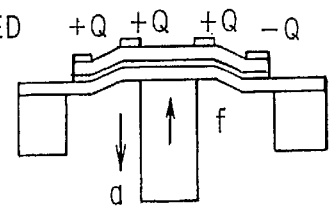
FIG. 5(c)
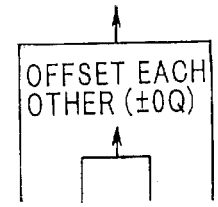
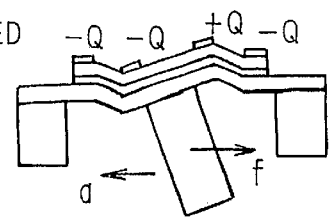

FORCE SENSOR CIRCUIT

BACKGROUND OF THE INVENTION

1. Field of the Invention

The present invention relates to a force sensor circuit having a force sensor element for detecting, through the use of a piezoelectric member, a physical quantity such as force, acceleration, or magnetic force acting from outside.

2. Description of the Related Art

There has been an increasing demand for sensors capable of accurately detecting a physical quantity such as force, acceleration, or magnetic force in the fields of automobiles and mechanical industries (such a sensor will be hereinbelow referred to as "a force sensor"). For example, a sensor in which a plurality of piezoelectric members are disposed on a flexible plate having an operating member thereon, has been disclosed (Japanese Unexamined Patent Publication No. 5-26744).

This sensor is constituted so that the flexible plate is bent by a force corresponding to a physical quantity acting on the operating member from outside. The sensor can three-dimensionally detect the direction and the magnitude of a physical quantity by detecting, with a single sensor element, electric charges generated in piezoelectric members in accordance with bending of the flexible plate.

An acceleration sensor using an operating member as a weight will now be described below by way of example. As illustrated in FIG. 2, when an acceleration "a" acts on the sensor from outside, an inertia force "f" acts on a weight 10 in the reverse direction of that of the acceleration, whereby a flexible plate 12 suspended between supporting bases 11 is bent at its portions between the weight 10 and the respective supporting bases, by the effect of the inertia force "f".

Electric charges in accordance with the direction and magnitude of the bending are generated in piezoelectric members 13 disposed on the flexible plate 12. This allows the direction and magnitude of acceleration acting from outside to be detected by extracting the electric charges from upper electrodes 14x, 14y, and 14z, and lower electrodes 18 as electric signals.

As shown in FIG. 3(a), the above-described force sensor element is typically constructed as a force sensor circuit 21 comprising at least a force sensor 22, a resistor 23 for converting electric charges generated in the piezoelectric members into voltages, and an operational amplifier (OP amp.) 24 for amplifying the voltages, which are all disposed on a printed circuit board 25.

More specifically, as shown in FIG. 3(c), since voltages are generated between a set of electrodes of the resistor 23 based on electric charges generated in the piezoelectric members 26 of the force sensor element, these voltages are input to the operational amplifier 24 for amplification.

It is well known that, in a force sensor as shown in FIG. 3(a), there is a frequency range peculiar to a sensor circuit that the sensor circuit can output, as shown in FIG. 4 (the lower limit of detection $f_{LC}$ and the upper limit of detection: $f_{HC}$; the frequency range will be referred to as "frequency characteristics" hereinbelow), and that the lower limit of detection $f_{LC}$ is determined by the capacitance C of the piezoelectric element 26 and the resistance value R of the resistor 23 (see the equation (1) shown below). That is, even if a given physical quantity acts on a force sensor element, the detection sensitivity of the force sensor is very low in the case where an operating member vibrates within a frequency range below the fLc value or above the $f_{HC}$ value.

$$f_{LC}=1/(2\pi RC) \tag{1}$$

Therefore, if the force sensor is required to detect an ultra low frequency vibration, it becomes necessary for the $f_{LC}$ value to be reduced by designing the capacitance C of piezoelectric element and/or the resistance R of the resistor to have high values.

The above-described force sensor element has, however, a size as small as about 5×5×1.5 mm, and each of the piezoelectric members composing piezoelectric element also has a small area, so that it is unlikely that the capacitance C can be designed to have a high value. In order to reduce the $f_{LC}$ value, therefore, the resistance R shown in the equation (1) is required to be designed to have a high value.

Accordingly, in the force sensor circuit as shown in FIG. 3(a), a resistor having a high resistance value of 10 MΩ or more (such a resistor is hereinbelow referred to as "an ultra-high-resistance resistor") is used as a resistor for converting electric charges generated in piezoelectric members into voltages.

There is a problem, however, that in the force sensor circuit using an ultra-high-resistance resistor as shown in FIG. 3(a) the resistance value R of the ultra-high-resistance resistor varies in the temperature characteristic among all sensor circuits, resulting in variances in the $f_{LC}$ value (i.e., frequency characteristic) among all the sensor circuits, as shown in FIG. 12(a).

SUMMARY OF THE INVENTION

The present invention has been achieved to overcome the above-described problem of the prior art and aims to provide a force sensor circuit capable of eliminating any variance in the $f_{LC}$ value (i.e., frequency characteristics) among all sensor circuits, and allowing the frequency characteristics of all the sensor circuits to be equalized, in the force sensor circuit having at least one ultra-high-resistance resistor of at least 10 MΩ.

In accordance with the present invention, there is provided a force sensor circuit comprising: a force sensor element having an operating member, a supporting base having a hollow portion and disposed around in the vicinity of the operating member, a flexible plate extending across over the hollow portion of the supporting base so as to suspend the operating member, and at least one piezoelectric element having a piezoelectric member sandwiched between a set of electrodes; at least one resistor having a resistance value of at least 10 MΩ for converting an electric charge generated in a piezoelectric member of the piezoelectric element into a voltage; and an operational amplifier for amplifying the voltage generated between the set of electrodes of the resistor, wherein the resistor is formed on the upper surface of the supporting base or on the upper surface of the operating member of the force sensor element.

A force sensor circuit of the present invention may be either a so-called two-axial force sensor element having piezoelectric elements corresponding to two arbitrary orthogonal axes of the x, y, and z axes, or a so-called three-axial force sensor element having piezoelectric elements corresponding to three orthogonal axes of x, y, and z. Also, this force sensor may be an acceleration sensor using an operating member as a weight.

It is preferable that a force sensor circuit of the present invention is constructed by electrically connecting a force sensor with a printed circuit board by wire bonding or flip-chip bonding.

The above and other objects, features and advantages of the present invention will become clear from the following description of the preferred embodiment when the same is read in conjunction with the accompanying drawings.

BRIEF DESCRIPTION OF THE DRAWINGS

FIG. 1 is an explanatory view showing an embodiment of a force sensor in accordance with the present invention, wherein

FIG. 2 is an explanatory views showing an embodiment of a force sensor used in the present invention, wherein

FIG. 3 is an explanatory view showing an embodiment of a conventional force sensor, wherein FIG. 3(a) is a plan view, FIG. 3(b) is a side view, and FIG. 3(c) is a circuit diagram.

FIGS. 5(a), 5(b) and 5(c) are explanatory views showing an operating principle of the force sensor used in the present invention.

FIG. 6 is an explanatory view showing a force sensor in the process of production, wherein

DESCRIPTION OF THE PREFERRED EMBODIMENT

Figure 1A:
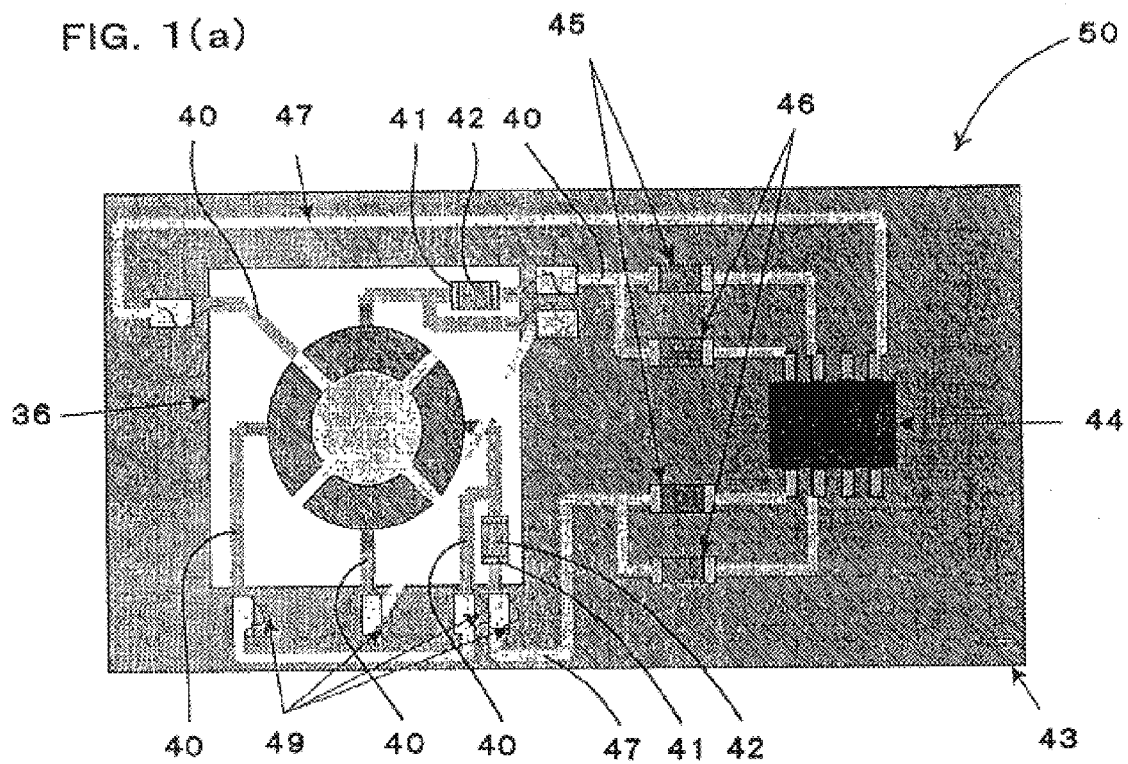
FIG. 1(a) is a plan view.
Figure 1B:
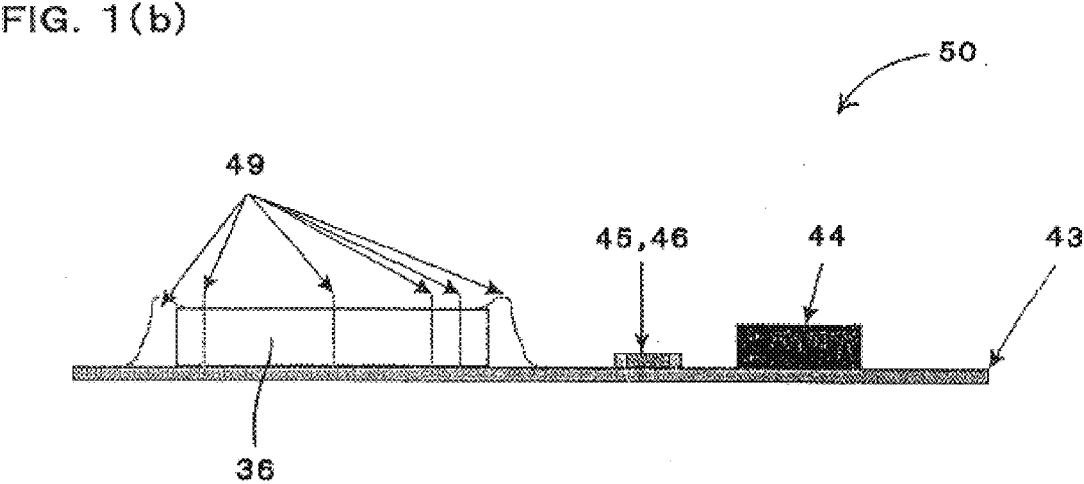
FIG. 1(b) is a side view.

The force sensor of the present invention is characterized in that a resistor having at least one resistance of 10 MΩ or more (i.e., "ultra-high-resistance resistor") is formed on the upper surface of a supporting base or on the upper surface of an operating member of the force sensor element.

In accordance with such features, variations in the temperature characteristics of the resistance value R of the ultra-high-resistance resistor and the capacitance C of the piezoelectric element offset each other, so that the product of the resistance value R and the capacitance C does not change with temperature, thus the $f_{LC}$ value is maintained constant, which permits the frequency characteristics of all the sensor circuits to be equalized.

Now, the force sensor circuit of the present invention will be described below in detail.

The force sensor of the present invention is a force sensor comprising a force sensor element, at least one ultra-high-resistance resistor, and an operational amplifier.

Here, the "force sensor element" in the present invention (simply referred to as a "sensor element" in some cases hereinafter) comprises, as exemplified in FIG. 2, an operating member 10, a supporting base 11 disposed around in the vicinity of the operating member 10, a flexible plate 12 extending across the opposing portions of the supporting base 11 so as to suspend the operating member 10, and a piezoelectric element 14 consisting of piezoelectric member 13 sandwiched between a set of electrodes, whereby the force sensor element can detect a physical quantity acting from outside by means of the piezoelectric member.

The operational member 10 in the sensor element is a member for generating bending in the flexible plate 12 by the force generated based on the magnitude and the direction of a physical quantity such as force, acceleration or magnetic force acting from outside, and it is suspended by the flexible plate 12 so that its upper surface is abutted against the flexible plate 12. Specifically, when a physical quantity to be detected is force, a bar may be used as an operating member. When a physical quantity is acceleration, a weight for converting the acceleration into force may be used as an operating member. When a physical quantity is magnetic force, a magnetic material for converting the magnetic force into force may be used as an operating member.

The operating member may be adhered to the flexible plate 12 with an adhesive or the like, or may be integrally formed with the flexible plate 12. The operating member is preferably suspended at the center of the flexible plate from the viewpoint of symmetry, but it does not necessarily require being suspended at the center of the flexible plate as long as a physical quantity can be detected. It is essential only that the operating member is suspended within the hollow portion of the supporting base.

The shape of the operating member is not particularly limited as long as it is such a shape that the operating member can be suspended so that its upper surface is abutted against the flexible plate. Apart from a cylinder, the shape of the operating member may be a shape of which outer diameter changes continuously or discontinuously such as a frustum cone or a anisodiametric cylinder. However, a cylindrical shape as shown in FIG. 2 is preferable, because it is highly symmetric with respect to the X-Y plane.

The material of the operating member is not also particularly limited. However, when using the operating member as a weight, it is preferable that the weight is formed of ceramic, because it has a sufficient mass and a high density, being also unsusceptible to electromagnetic waves and having a low thermal expansion coefficient.

The supporting base 11 in the sensor element is a member for holding the flexible plate 12 and the operating member 10, and is disposed around the operating member positioned at the center of the sensor element. The shape and material of the supporting base are, therefore, not particularly limited as long as the supporting base has a strength such as to hold the flexible plate 12 and the operating member 10.

Figure 2A:
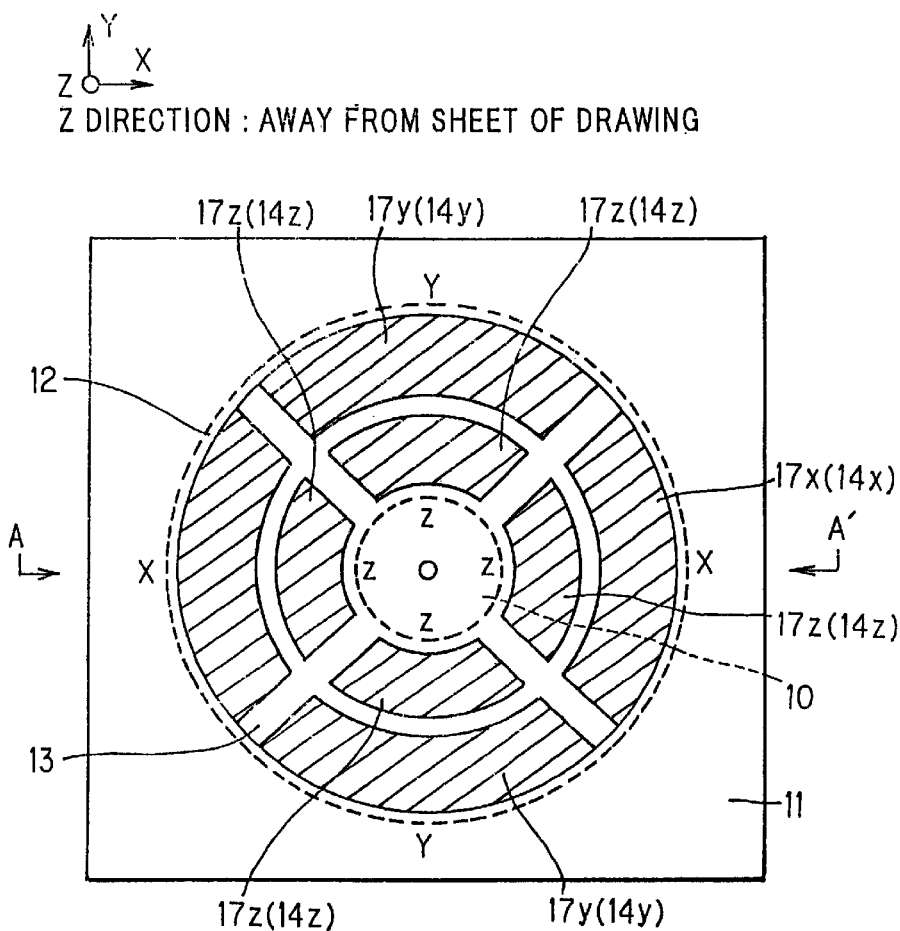
FIG. 2(a) is a plan view.
Figure 2B:
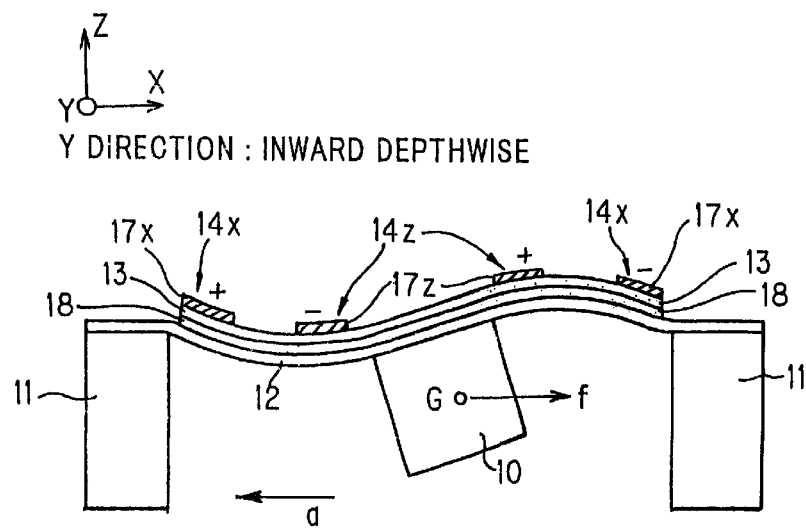
FIG. 2(b) is a sectional view taken along a line A–A' of FIG. 2(a).
Figure 4:
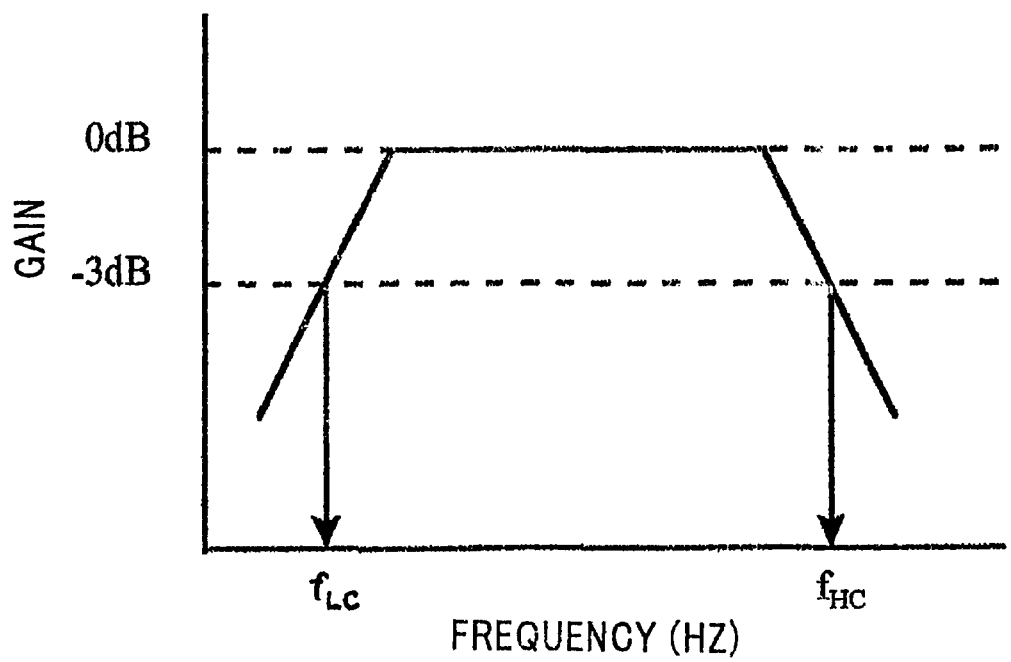
FIG. 4 is a graph showing frequency characteristics of the force sensor used in the present invention.

It is preferable, however, that the supporting base has an outside shape of a square pillar and has a cylindrical hollow portion therein as shown in FIG. 2, because of its workability and high symmetry with respect to the X-Y plane. As material, preferably the supporting base is formed of ceramic, which has a high rigidity and which is unsusceptible to electromagnetic waves.

The flexible plate 12 in the sensor element is a tabular member which extends across the opposing portions of the supporting base 11, suspending the operational member 10 thereon, and which has a piezoelectric element. The whole of the flexible plate may consist of a piezoelectric member.

The flexible plate has flexibility and its shape and material are not particularly limited as long as it is not broken due to behavior of the operational member. Preferably the flexible plate is formed of ceramic, which has a high Young's modulus, easily inducing strain to a piezoelectric member. As to the shape, it is preferable that the flexible plate is formed of a tabular body 12 as shown in FIG. 2, because of its workability.

Piezoelectric elements each consisting of a piezoelectric member 13 sandwiched between a set of electrodes are provided on the flexible plate. As a piezoelectric member, a piezoelectric ceramic such as PZT, PMN or PNN, or an organic piezoelectric member may be used. It is preferable, however, to use PZT having a superior piezoelectric characteristic. The shape of piezoelectric member is not particularly limited. For example, the piezoelectric member 13 may be formed over the whole of the upper surface of the flexible plate 12 as shown in FIG. 2.

Here, the term "a piezoelectric element" in the present invention represents an element for electrically detecting a physical quantity acting from outside, and consisting of a piezoelectric member sandwiched from the upward and downward directions by a set of electrodes (an upper electrode and a lower electrode).

The piezoelectric element therefore does not necessarily need to be formed by dividing a piezoelectric element into a upper electrode, a piezoelectric member and a lower electrode for each piezoelectric element. As shown in FIG. 2, piezoelectric elements 14$x$, 14$y$, and 14$z$ may be formed by forming a lower electrode 18 and a piezoelectric member 13 over the whole of the upper surface of the flexible plate 12 and by dividing only an upper electrode into 17$x$, 17$y$, and 17$z$ and disposing them.

In the force sensor circuit in the present invention, it is essential only that the sensor element has a piezoelectric element corresponding to at least one orthogonal axis of the three axes of x, y and z. The sensor element may, however, have piezoelectric elements corresponding to two arbitrary orthogonal axes of x, y and z (hereinafter referred to as "two-axis sensor element"), or may have piezoelectric elements corresponding to the three orthogonal axes of x, y and z (hereinafter referred to as "three-axis sensor element").

In these sensor elements, the piezoelectric element corresponding to each axis typically has at least one pair of piezoelectric elements disposed at the symmetric positions with respect to the midpoint of the operational member 10.

Among piezoelectric members composing the pair of piezoelectric elements, ones for the X and Y axes are polarized so as to have opposite polarities to each other, and ones for the Z axis are polarized so as to all have equal polarities.

By virtue of such a polarization treatment, when the operational member 10 vibrates in the Z-axis direction as shown in FIG. 5(b), heteropolar electric charges generated in the piezoelectric elements 14$x$ for the X axis and 14$y$ for the Y axis (not shown) offset each other, so that no electric signal is output. On the other hand, when the operational member 10 vibrates in the X- and Y-axis directions as shown in FIG. 5(c), heteropolar electric charges generated in the piezoelectric elements 14$z$ for the Z axis offset each other, so that no electric signal is output.

That is, in accordance with these sensor elements, a component for each axis of X, Y and Z can be detected without being influenced by physical quantities acting in any other axial directions. This permits the direction and the magnitude of physical quantities acting from outside to be detected two-dimensionally or three-dimensionally using a single sensor element by synthesizing the components.

The sensor element having the above-described construction can be formed by a green sheet lamination technique in which a plurality of green sheets each cut into a shape of dislocation of the sensor element are laminated, being press-bonded into a one-piece sensor element, and are then fired. By forming a lower electrode, a piezoelectric member, and upper electrodes on the fired body as described above, by a thick-film technique employed in screen printing or the like, a small-sized, high-sensitivity, and high-precision sensor element can conveniently be produced.

The term resistor generally refers to a circuit element having a given resistance value. In the force sensor circuit of the present invention, the resistor may include resistors as ordinary resistors (hereinafter referred to as "ordinary resistors") in addition to at least one resistor (i.e., "ultra-high-resistance resistor") which is a indispensable component, having a resistance value of 10 M$\Omega$ or more for converting an electric charge generated in a piezoelectric member composing a piezoelectric element into a voltage.

The ultra-high-resistance resistor is connected in parallel with a force sensor element. In the case where the sensor element consists of two-axis sensor elements, two ultra-high-resistance resistors corresponding to each detection axis required, whereas in the case where the sensor element consists of three-axial sensor elements, three ultra-high-resistance resistors corresponding to each detection axes of X, Y and Z are required.

On the other hand, the ordinary resistor is a resistor used as usual circuit component and its resistance value is less than 10 M$\Omega$ (usually some k$\Omega$), unlike that of an ultra-high-resistance resistor. As an ordinary resistor, for example, a thick-film chip resistor may be used, which is mounted on a printed circuit board by soldering.

The term operational amplifier generally refers to an operational amplifier for amplifying an analog voltage or for performing the four fundamental operations of arithmetic: addition, subtraction, multiplication, and division. Particularly in the present specification, an operational amplifier refers to a circuit element used for amplifying a voltage generated between a set of electrodes of an ultra-high-resistance resistor.

Specifically, a high-input-impedance operational amplifier such as C-MOS can suitably be used. This is because, if an input impedance of an operational amplifier is low, electric current will flow not in the ultra-high-resistance resistor but in the operational amplifier, and consequently it will be impossible to ensure a voltage drop by the ultra-high-resistance resistor.

The sensor circuit of the present invention is constituted by comprising at least a force sensor, at least one ultra-high-resistance resistor, and an operational amplifier as described above, and, when necessary, disposing circuit elements used as usual circuit components such as capacitors or resistors on a printed circuit board, and by interconnecting these electrically by thick-film conductors, thin-film conductors, wire bonding, soldering, or the like.

Figure 12A:
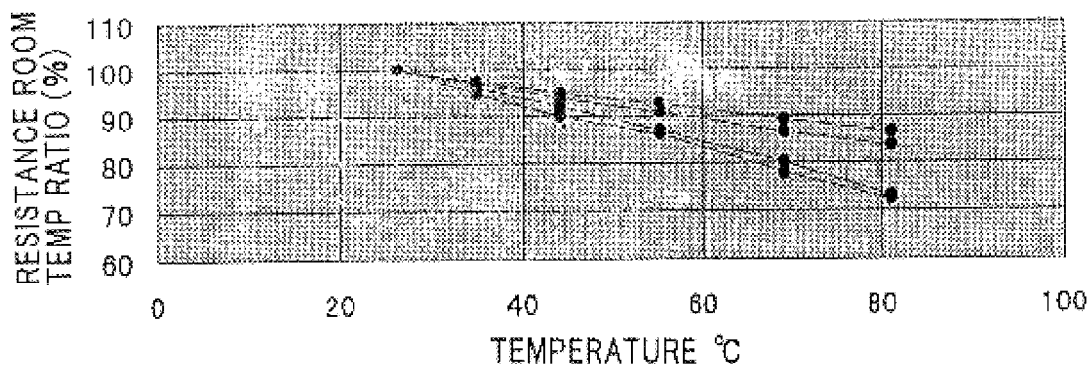
FIGS. 12(a) and 12(b) are graphs showing temperature characteristics of ultra-high-resistance resistors.

Incidentally, there is a problem that in the force sensor circuit using an ultra-high-resistance resistor as shown in FIG. 3(a), the resistance value R of the ultra-high-resistance resistor varies in the temperature characteristic among all sensor circuits, resulting in variances in the $f_{LC}$ value (i.e., frequency characteristics) among all the sensor circuits, as shown in FIG. 12(a). The reason why such a problem is caused is assumed to be as follows.

Figure 12B:
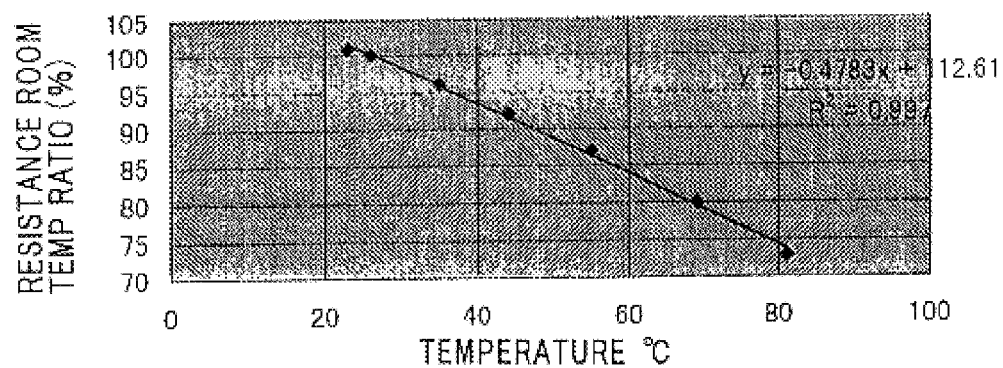
Figure 12C:
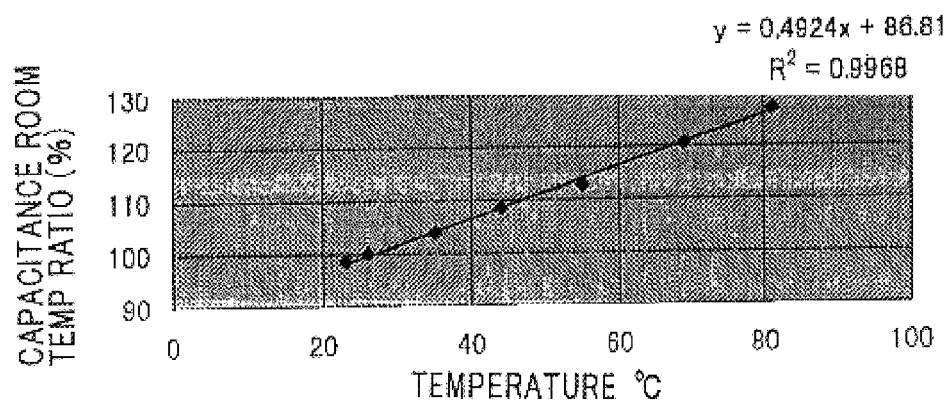
FIG. 12(c) is a graph showing temperature characteristic of a capacitance of a piezoelectric member.

An ultra-high-resistance resistor has a negative temperature characteristic that its resistance value R decreases as the temperature increases (FIG. 12(b)) because of its semiconductor property, whereas the capacitance C of a piezoelectric element has a positive temperature characteristic that the capacitance C increases as the temperature increases toward the Curie point (FIG. 12(c)). And the slope of temperature characteristic curve of the ultra-high-resistance resistor is nearly equal to that of temperature characteristic curve of the piezoelectric element though these slopes have opposite signs. It is therefore considered that the product of the resistance value R and the capacitance C is constant independently of the temperature, thus the $f_{LC}$ value determined by the equation (1) shown below remains unchanged.

$$f_{LC}=1/(2\pi RC) \tag{1}$$

However, even if the ultra-high-resistance resistors themselves of all sensor elements actually have the same temperature characteristic, the state of bonding between an ultra-high-resistance resistor and a printed circuit board will have an influence on the mechanical expansion and contraction of the ultra-high-resistance resistor due to temperature, if the state of bonding is varied among all sensor elements. Hence, variances in the temperature characteristic of the ultra-high-resistance resistor among all sensor circuits will occur, as shown in FIG. 12(a).

A similar phenomenon occurs in piezoelectric elements; however, since a piezoelectric element is formed integrally on a sensor element, the problem lies in a state of bonding between an sensor element and a printed circuit board. That is, an ultra-high-resistance resistor and a piezoelectric element have temperature characteristics varying in accordance with different factors, and hence the product RC of the resistance value R and the capacitance C varies with the temperature, resulting in a non-constant $f_{LC}$ value.

Accordingly, in the present invention, the ultra-high-resistance resistor has been formed on the upper surface of the supporting base or on the upper surface of the weight of the force sensor element. In accordance with such a construction, since both the ultra-high-resistance resistor and the piezoelectric element are formed on a sensor element, it is only the state of bonding between an sensor element and a printed circuit board which has an influence on temperature characteristics of the resistance value R and the capacitance C. That is, since the temperature characteristics of the resistance value R and the capacitance C vary according to the identical factor, variations in their temperature characteristics offset each other, and as a consequence, the product RC of the resistance value R and the capacitance C does not vary with the temperature, leading to a constant $f_{LC}$ value.

Further, the features of the present invention such as the ultra-high-resistance resistor being formed on the upper surface of the supporting base or on the upper surface of the weight of the force sensor element also has advantages as follows.

Firstly, the sensor circuit of the present invention allows capacitance trimming and resistance trimming to be executed by the identical laser processor without adjusting the focal length thereof. In regard to the sensor element, in order to adjust its sensitivity while maintaining the $f_{LC}$ value constant, trimming for adjusting the capacitance C or the resistance value R is performed by partially cutting off the upper electrodes and the ultra-high-resistance resistor using a YAG laser or the like.

Since the sensor circuit of the present invention is formed so that a piezoelectric element and an ultra-high-resistance resistor are flush with each other unlike the case of a conventional sensor circuit, it permits the piezoelectric element and the ultra-high-resistance resistor to be trimmed without adjusting the focal length of a laser, and eliminates the need for preparing two laser processors having different focal lengths.

Secondly, in the sensor circuit of the present invention, since the ultra-high-resistance resistor is disposed on the upper surface of the sensor element which is originally a dead space, there is no need for a space in which the ultra-high-resistance resistor is to be disposed on the printed circuit board. This enables the planning of the reduced-size sensor circuit itself.

This is described more specifically taking a three-axis sensor element as an example. A sensor circuit in this case can be reduced in size in terms of a space of 1.0 mm×0.5 mm×3 pieces as compared with the case where a thick-film resistor is disposed on the printed circuit board. This is a great merit for a sensor circuit which is required to be reduced in size, even though the space saved is only on such a small scale.

In the present invention, the ultra-high-resistance resistor may be disposed either on the upper surface of the supporting base or on the upper surface of the weight. However, preferably it is disposed on the upper surface of the supporting base, because of the ease of wiring.

In the case where the ultra-high-resistance resistor is disposed on the upper surface of the supporting base or the upper surface of the weight of the sensor element, it is preferable that the ultra-high-resistance resistor is an integrally-formed resistor (hereinafter referred to as "an integrally-formed type resistor") formed between routing electrodes on the sensor element, by thick printing and firing. This is because, if a separate chip resistor is mounted on a sensor element, the state of the bonding between the sensor element and the chip resistor can have an influence on the temperature characteristic of the resistance value R.

The integrally-formed type resistor may be produced, for example, in the manner in which, firstly, parts of a wiring pattern with thick conductors or thin conductors are broken, then electrodes of the resistor are formed on both the ends of the broken wiring pattern by thick-film printing and firing, lastly a resistor itself is formed between the electrodes by performing thick-film printing with a paste resistor consisting of a mixture of oxide resistor material such as $RuO_2$ and a low melting-point glass such as a boro-silicate glass, and then firing.

Such a method is useful as a method for electrically connecting an ultra-high-resistance resistor which can markedly decrease the resistance value under the influence of flux contained in solder in the case where the resistor is directly soldered.

In the above case, the formation order of the conductors, the resistor itself, and the electrodes of the resistor is not particularly limited. Typically, these are successively formed in the order of decreasing firing temperature. However, all of the conductor, the resistor itself, and the electrodes of the resistor may simultaneously fired after printing. Also, a glass-coating layer may be provided for protecting the surface of the resistor using a similar method.

Further, it is preferable, in the present invention, that the force sensor element be electrically connected with the print circuit board by wire bonding or flip-chip bonding. In the case that the force sensor element is conventionally connected by soldering a lead, the resistance value of an ultra-high resistance resistor on the sensor element is markedly decreased, even if an electrode of an ultra-high resistance resistor is not directly soldered, because the sensor element itself is very small.

In the case of wire bonding, for example, a high purity wire of tens to hundreds μm in diameter such as Al or Au is connected between terminals by thermocompression bonding, supersonic, thermosonic etc., and hence there is no influence of flux, unlike the case of soldering.

[Embodiment]

The force sensor circuit of the present invention will be described in more detail below, through illustration of an embodiment in the context of an acceleration sensor circuit having X- and Y- two-axis acceleration sensor elements, by way of example.

EXAMPLE 1

The production process of an acceleration sensor circuit comprises the steps of (1) producing a structure of a sensor element, (2) forming a piezoelectric element and ultra-high-resistance resistors, (3) producing a circuit board, and (4) connecting the sensor element to the circuit board as follows:

(1) Production of a Structure of a Sensor Element

Figure 6A:
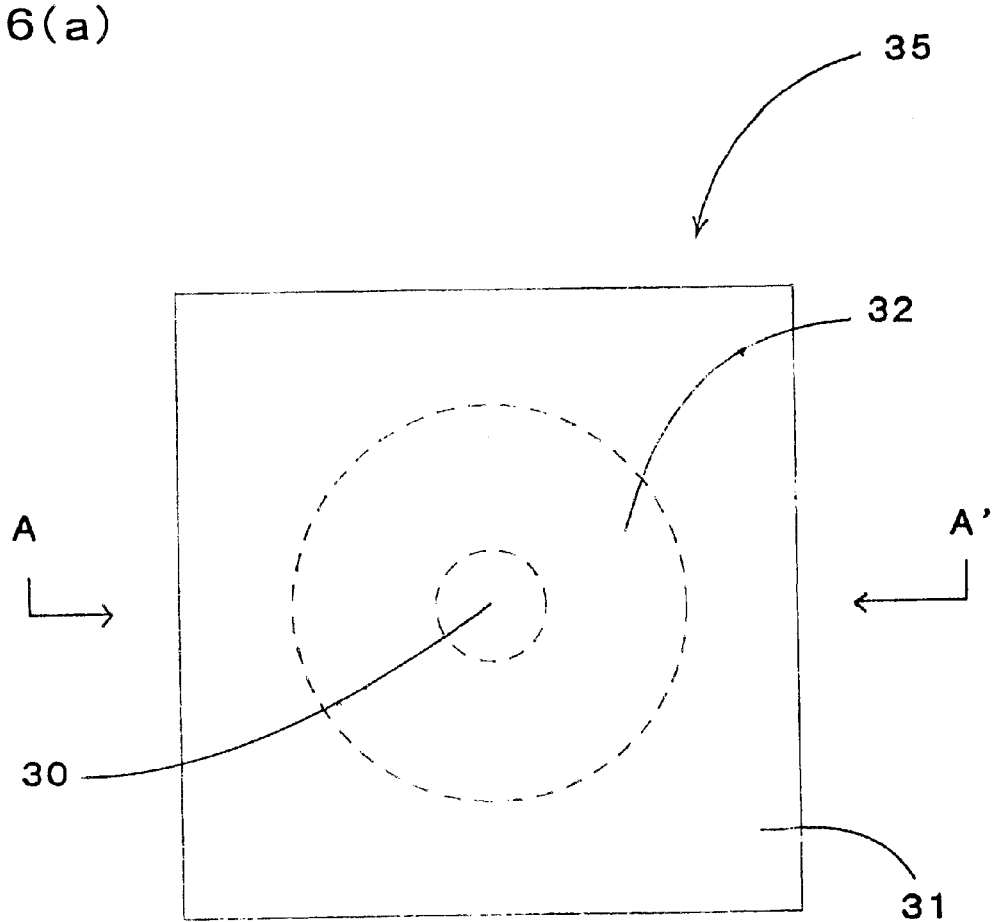
FIG. 6(a) is a plan view.
Figure 6B:
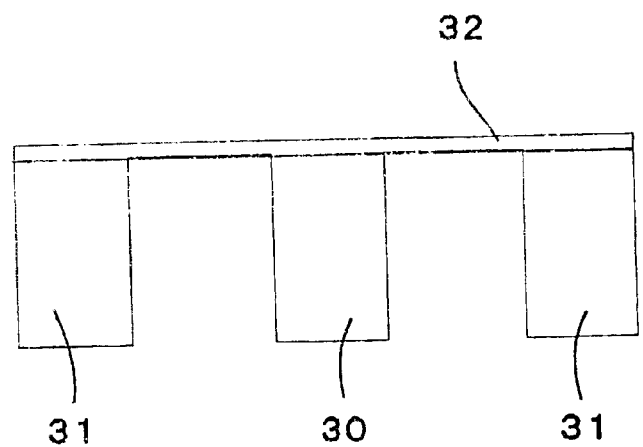
FIG. 6(b) is a side view.

Firstly, a structure of a sensor element providing a base of a sensor element was produced. As shown in FIG. 6, since the structure of a sensor element 35 consists of components of a weight 30, a supporting base 31, and a flexible plate 32, the structure of the sensor element 35 was produced by laminating a plurality of green sheets each cut into a shape of dislocation for each of the components, press-bonding them into an integrally-formed sensor element, and then firing (green-sheet lamination technique).

(2) Formation of a Piezoelectric Element and Ultra-high-resistance Resistors

Next, a piezoelectric element and ultra-high resistance resistors were formed on the sensor element structure.

Figure 7:
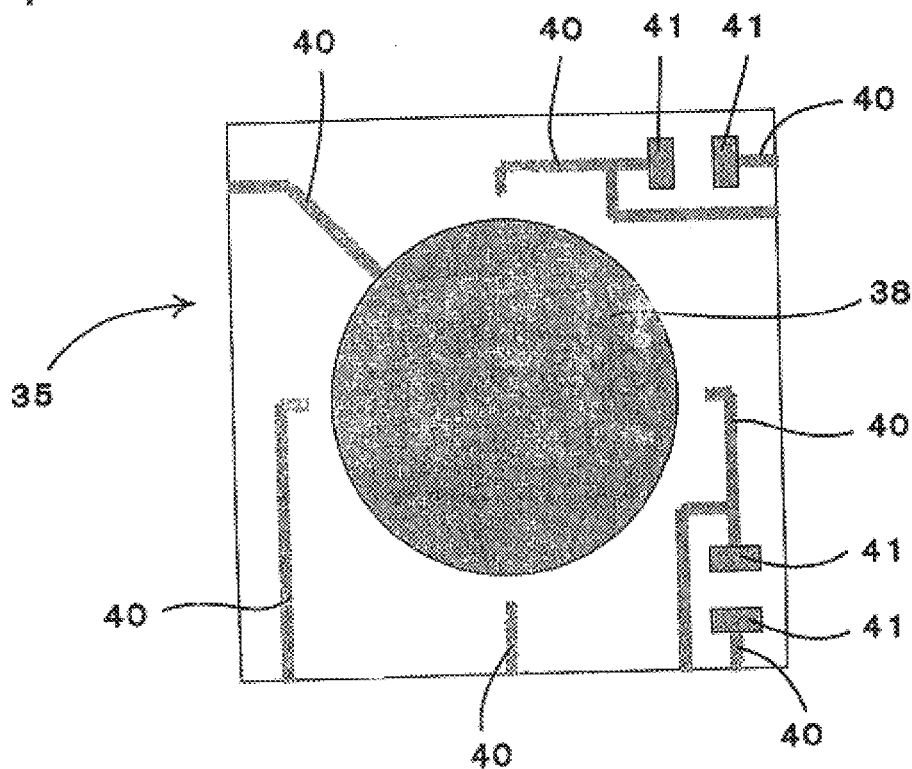
FIG. 7 is a schematic plan view showing a force sensor in the process of production.

Specifically, firstly, as shown in FIG. 7, a lower electrode 38, routing electrodes 40, and electrode terminals 41 of the ultra-high-resistance resistor were formed by performing screen-printing with a conductive paste containing Pt and/or Pd and Ag, and firing.

Figure 8:
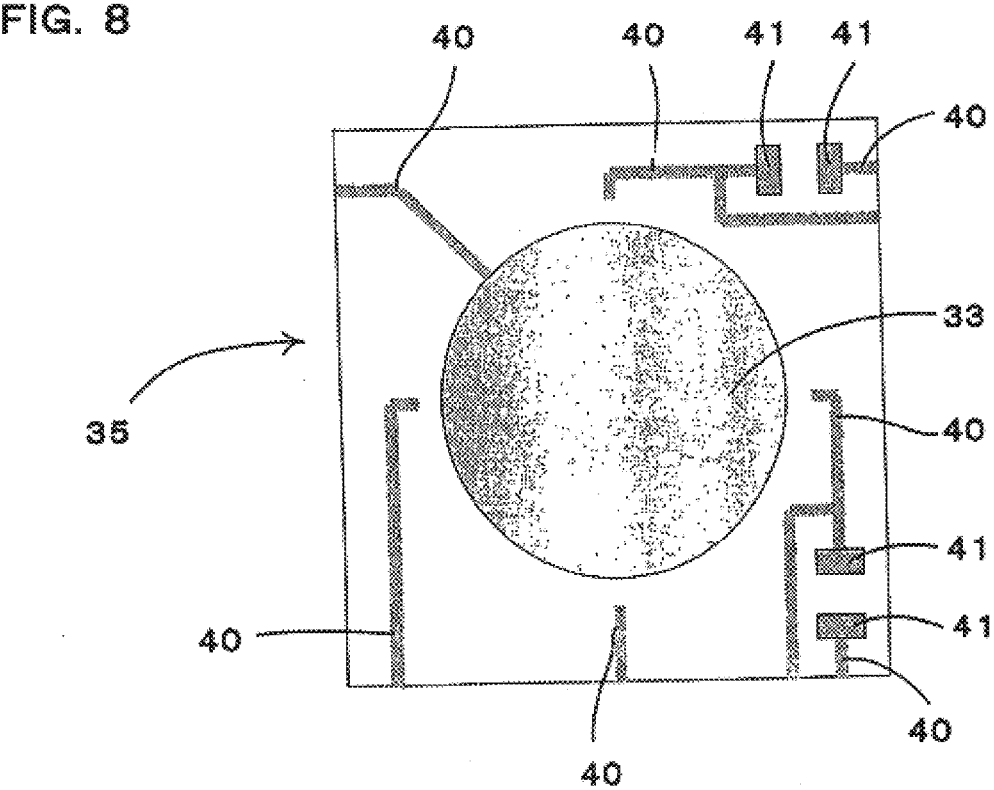
FIG. 8 is a schematic plan view showing a force sensor in the process of production.
Figure 9:
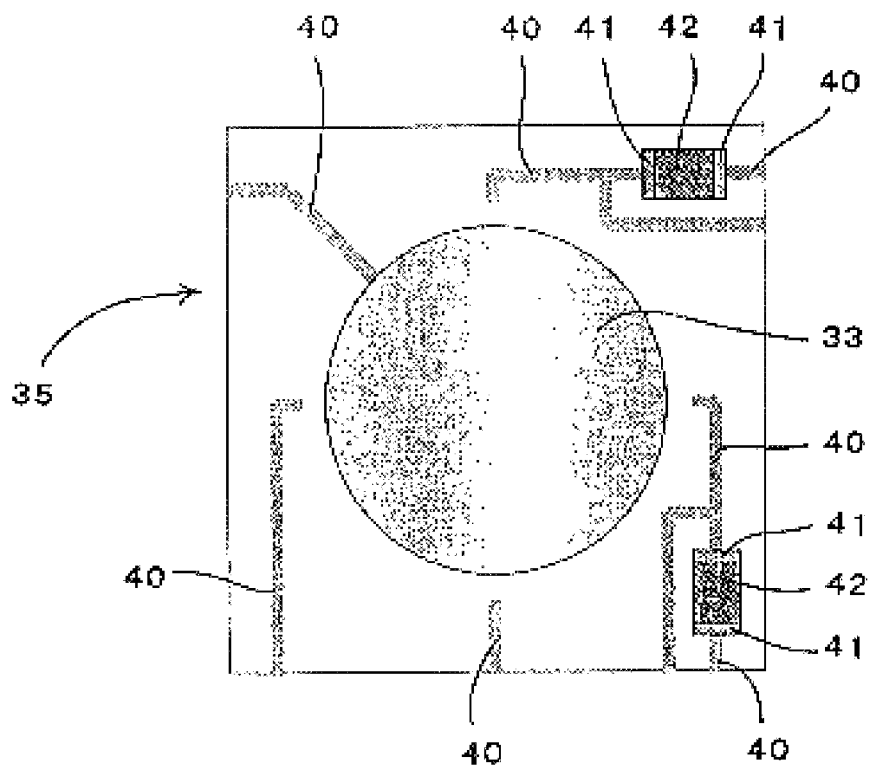
FIG. 9 is a schematic plan view showing a force sensor in the process of production.
Figure 10:
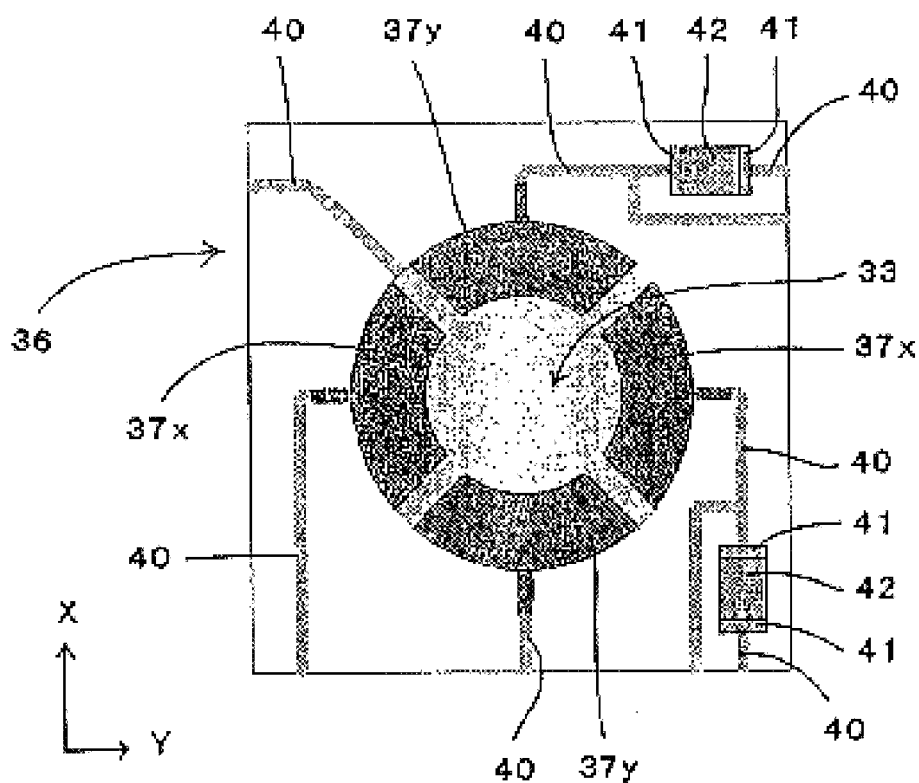
FIG. 10 is a schematic plan view showing a force sensor in the process of production.

Thereafter, in the same way, a piezoelectric element and ultra-high-resistance resistors were successively formed by repeating screen-printing and firing operations in the manner in which a piezoelectric member 33 was screen-printed with a piezoelectric member paste containing PZT and PMN, PNN etc., and then fired (FIG. 8), then ultra-high-resistance resistors 42 were screen-printed with a resistive paste containing $RuO_2$, boro-silicate glass etc., and then fired (FIG. 9), and lastly upper electrodes 37a and 37b were screen-printed with a conductive paste containing Au organic metal and then fired (thick-film technique).

(3) Production of a Circuit Board

In the meantime, a circuit board for mounting the sensor element was separately produced.

Firstly, a printed circuit board was produced by cladding a plastic board with copper foil and etching it.

Figure 11:
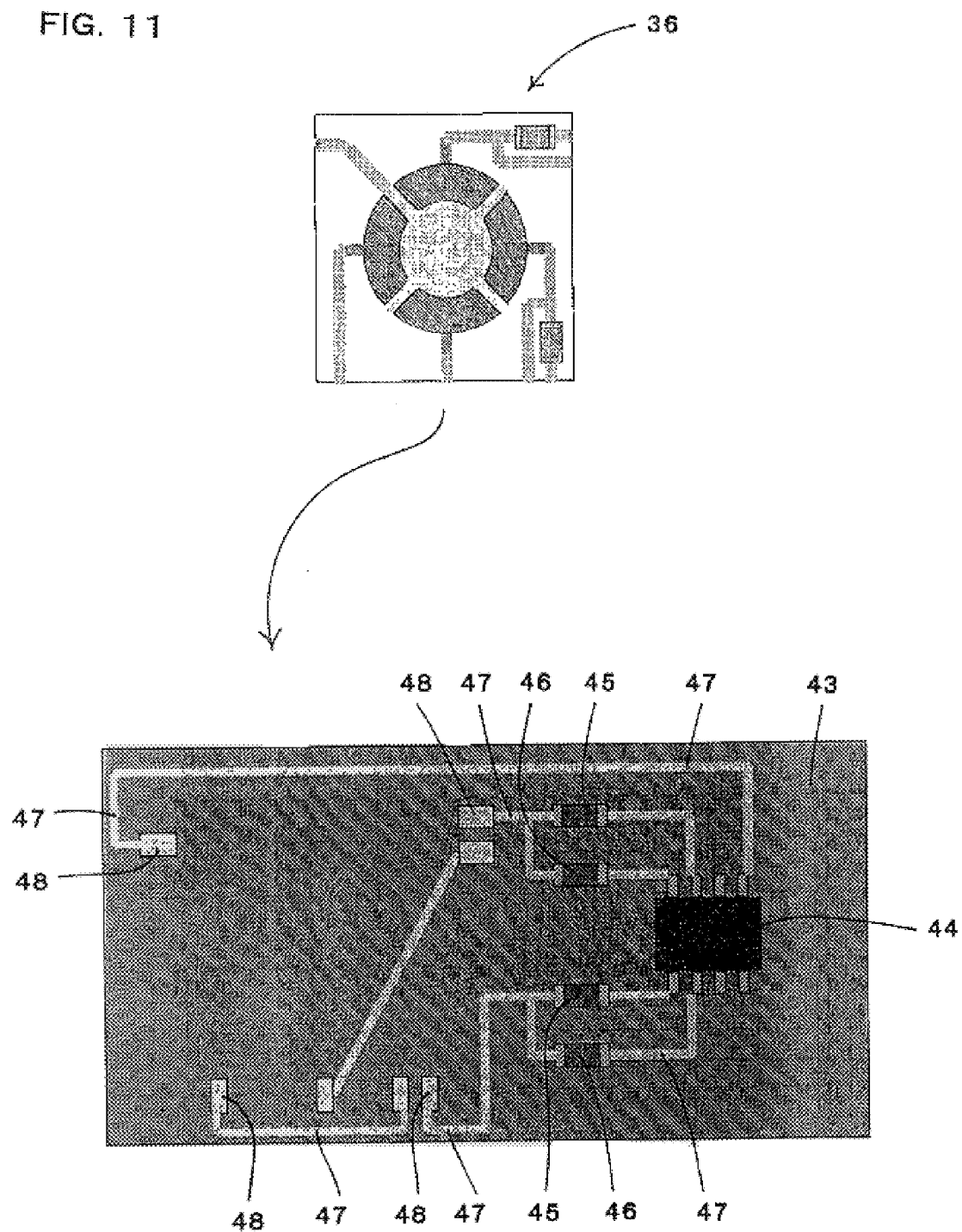
FIG. 11 is a schematic plan view showing a force sensor in the process of production.

Next, as shown in FIG. 11, a C-MOS operational amplifier 44, and capacitors 45 and resistors 46 as circuit elements were mounted by soldering on the printed circuit board 43 on which printed wiring 47 and electrode terminals 48 had been formed, and then a sensor element 36 was fixed on the printed circuit board, thus achieving a desired circuit board.

(4) Connection of the Sensor Element with the Circuit Board

Lastly, the routing electrodes 40 of the sensor element 36 and the electrode terminals 48 of the circuit board were interconnected with bonding wires 49, and thus the acceleration sensor circuit 50 was achieved (wire bonding technique).

As described above, in accordance with the force sensor of the present invention, variations in the temperature characteristic of resistance value R of the ultra-high-resistance resistor and the capacitance C of the piezoelectric element offset each other, so that the product of the resistance value R and the capacitance C does not change with temperature, thus $f_{LC}$ value is maintained constant, which permits the frequency characteristics of all the sensor circuits to be equalized.

Further, the sensor circuit of the present invention allows capacitance trimming and resistance trimming to be performed by means of the same laser processor without the need for adjusting a focus length. In addition, the sensor circuit of the present invention obviates the necessity for a space in which the ultra-high-resistance resistor is to be disposed on the printed circuit board, and thus enables the planning of the reduction in size of the sensor circuit itself.

Although the invention has been described through its preferred form, it is to be understood that various changes and modifications may be imparted thereto without departing from the scope of the present invention which is limited solely by the appended claims.

What is claimed is:

1. A force sensor circuit comprising:

a force sensor element having an operating member, a supporting base having a hollow portion and disposed around in the vicinity of said operating member, a flexible plate extending across over the hollow portion of said supporting base so as to suspend the operating member, and at least one piezoelectric element having a piezoelectric member sandwiched between a set of electrodes;

at least one resistor having a resistance value of at least 10 MΩ for converting an electric charge generated in the piezoelectric member of said piezoelectric element into a voltage; and an operational amplifier for amplifying a voltage generated between the set of electrodes of said resistor, wherein said resistor is formed on the upper surface of the supporting base or on the upper surface of the operating member of the force sensor element.

2. A force sensor circuit as claimed in claim 1, wherein said force sensor element is a force sensor element having piezoelectric elements corresponding to two out of three orthogonal axes of the x, y, and z axes.

3. A force sensor circuit as claimed in claim 1, wherein said force sensor element is a force sensor element having piezoelectric elements corresponding to three orthogonal axes of x, y, and z.

4. A force sensor circuit as claimed in claim 1, wherein said force sensor element is an acceleration sensor element using said operating member as a weight.

5. A force sensor circuit as claimed in claim 2, wherein said force sensor element is an acceleration sensor element using said operating member as a weight.

6. A force sensor circuit as claimed in claim 3, wherein said force sensor element is an acceleration sensor element using said operating member as a weight.

7. A force sensor circuit as claimed in claim 1, wherein said force sensor element is electrically connected with a printed circuit board by wire bonding or flip-chip bonding.

8. A force sensor circuit as claimed in claim 2, wherein said force sensor element is electrically connected with a printed circuit board by wire bonding or flip-chip bonding.

9. A force sensor circuit as claimed in claim 3, wherein said force sensor element is electrically connected with a printed circuit board by wire bonding or flip-chip bonding.

10. A force sensor circuit as claimed in claim 4, wherein said force sensor element is electrically connected with a printed circuit board by wire bonding or flip-chip bonding.

* * * * *